United States Patent [19]
Belcher et al.

[11] 3,871,768
[45] Mar. 18, 1975

[54] MOLECULAR EMISSION CAVITY ANALYSIS

[76] Inventors: Ronald Belcher, 9 Chad Rd., Birmingham B15 3EM; Alan Townshend, 2 Selby Close, Birmingham B29 2JG; Stanley Bogdanski, Flat 8, 7 Park Hill, Birmingham 13, all of England

[22] Filed: Aug. 20, 1973

[21] Appl. No.: 389,587

[30] Foreign Application Priority Data
Aug. 24, 1972 Great Britain .................. 39443/72

[52] U.S. Cl. .................. 356/87, 356/187, 356/244
[51] Int. Cl. .................. G01j 3/30
[58] Field of Search ............. 356/87, 187, 244, 246

[56] References Cited
UNITED STATES PATENTS
| | | | |
|---|---|---|---|
| 3,565,538 | 2/1971 | Kahn et al. | 356/87 |
| 3,644,743 | 2/1972 | Binek et al. | 356/87 |
| 3,708,228 | 1/1973 | Delves | 356/87 |

*Primary Examiner*—Vincent P. McGraw

[57] ABSTRACT

Apparatus is disclosed for analysing a sample of matter by emission spectroscopy. The apparatus includes an emission promoting structure defining a sheltered region whereby a reactant vapour can be retained within the region whilst being exposed to flame gas whilst at the same time permitting optical analysis of the interacting gases in the sheltered region. A novel method of analysis is also disclosed.

41 Claims, 9 Drawing Figures

PATENTED MAR 18 1975　　　　　　　　　　　　　　　3,871,768

MOLECULAR EMISSION CAVITY ANALYSIS

This invention relates to flame emission spectroscopy, which is a technique for detecting and analysing emission spectra from samples of matter exposed to a flame, with particular usefulness for molecular emissions and usually using a cool flame such as a diluted hydrogen flame. The emission spectrum exhibits bands at frequencies characteristic of selected components of the sample as by reduction of sample molecules by hydrogen radicals of the flame or by formation of new molecules by interaction with hydrogen and other substances present. Thus, by investigating the spectrum or selected portions of it, the presence of particular components in the sample, or their absence from the sample, can be ascertained by emissions from selected species, in the case of molecular emissions, these occurring normally at temperatures in the range of 200° to 800°C depending upon the species concerned.

One of the disadvantages of the known methods of flame emission spectroscopy is that the sample is destroyed almost immediately, so the time available for analysis is very short and only one element can be investigated at a time. If a broader analysis is required, either several separate analyses are necessary or a technique for continuous introduction of a sample into the flame has to be adopted. The latter techniques are either not suitable for particular samples or are otherwise unsatisfactory, for example due to overheating, or they are relatively complicated. In any case where more than one element is to be investigated, a relatively large and homogeneous sample is required.

Another disadvantage of the known methods of flame emission spectroscopy concerns the lack of consistency, uniformity and reproducibility of results.

The present invention provides a method of, and an apparatus for, flame emission molecular spectroscopy which aims at overcoming the said disadvantages; in particular, it enables a broad analysis to be made of a single small sample, and it enables an analysis to be made which is reproducible to an improved degree.

According to one aspect of the invention, a method of analysing a sample of matter by molecular flame emission comprises providing an emission-promoting structure defining a sheltered region, exposing reactant vapor within the region to flame gas and focusing an optical analysis device upon the interacting gases. In the preferred embodiment this is accomplished by placing the sample in an open cavity in a holder, disposed with the cavity opening in a flame, and detecting radiation emitted by the sample through the opening of the cavity.

It has been found that the emission from the sample is persistant, even in the case of a very small sample. This affords time for analysing the emission characteristics over a wide frequency range, without having to introduce additional sample material during the course of the analysis. (However, as indicated below, in some cases the sample can be replenished during the analysis if desired.) The sample is thus protected from excessive contact with the flame and from other disturbing influences and is carried away by the flame only at a slow rate.

According to another aspect of the invention, apparatus for analysing a sample of matter by molecular flame emission comprises a molecular emission-promoting structure for use with an optical emission analysis device, the structure defining a sheltered region for containing reactant vapor, an exposure path for exposing reactant vapor in the sheltered region to flame gas and an optical path projecting out of the sheltered region whereby under conditions influenced by the structure the reactant vapor and flame gas can mix, interact, and emit along the optical path to the analysis device radiation characteristic of the interaction. In preferred embodiments a flame outside of the structure is employed, preferably with flames between about 5 and 50 mm in diameter and a flame height between about 30 and 200 mm, and the structure defining the sheltered region is preferably smaller than the flame, a guide device securing it in a predetermined position in a portion of the flame. Also preferably a support surface is provided for a liquid or solid reactant to be vaporized and a sheltering surface is spaced a predetermined distance above the support, the space therebetween comprising the sheltered region. Preferably a side opening provides the exposure path for the interaction. Preferably also the said support and sheltering surfaces are connected by side wall surfaces which also have a sheltering effect, the sheltered region thus being a hollow space in a solid member. The presently preferred embodiment of the apparatus comprises a burner for producing a flame, a sample holder having an open cavity for receiving the sample, means for supporting the holder, and flame photometric instrumentation, all so arranged that the holder can be supported with the cavity opening in the flame from the burner, and a radiation detector element of the said instrumentation can detect radiation emanating from the cavity.

The means for supporting the holder may support the holder in a movable manner so that the holder can occupy a position clear of the flame, preferably with the cavity opening uppermost, in which position the sample can be introduced into the cavity, and can be moved from this position into the flame. Preferably, when the holder is in the latter position the opening of the cavity is disposed almost at right angles to the flame axis so that the predominant direction of movement of the flame gas in the vicinity of the opening is generally across the opening, but preferably pitched slightly towards the burner, so that there is a slight tendency for a small portion of the flame to be intercepted to enter the cavity. Also, in this position of the holder, the cavity opening is preferably directly aligned with the detector element of the instrumentation so that the detector element receives the maximum possible amount of radiation from the sample.

In general the sheltered region ranges from about 1 cubic millimeter to 1 cubic centimeter in size; in the case of the structure defining a hollow space with an opening, such as the cavity of the holder mentioned above, the opening is about 1 millimeter to 1 centimeter in diameter, and in the case of a cavity with a closed end, its depth is of the order of its diameter.

As the holder or similar emission-promoting structure is present in or exposed to the flame it should be made of a material which does not emit radiation (or at least such that the emission from the sample can be measured in the presence of radiation from the holder) during the analysis. There may be provision for cooling the holder and/or its supporting means. Also, it may be desirable to use a cool flame, e.g. of hydrogen diluted with an inert gas such as helium. However, the temperature of the sample is a factor (but not the only factor) in stimulating its emission, so if the holder would otherwise be too cool, additional heating means may be provided for the holder adjacent the cavity.

To explain this more fully, in any emission-promoting structure according to the invention it is often desirable, depending upon the particular interaction, to have a heat control surface adjacent the sheltered region. Depending upon the particular condition of the analysis, this may be achieved in various ways. A surface may be connected through a heat conductive path to a conductive mass defining a heat sink, e.g., an appropriate mass of a holder, or a surface may be connected through a heat transfer path of predetermined heat transfer properties to a heat receiving surface exposed to flame outside of the sheltered region. Cooling of a surface of the sheltered region contacting the interacting gases can produce enhanced emission according to the Salet phenomenon, while heating of a surface in contact with a liquid or solid sample can be effective to contribute to desired decomposition and vaporization of the reactant. Cooling and heating of different surfaces of the same structure is possible through selection of material, size and shape of respective portions of the structure or even by providing electric or liquid heating or cooling in localized regions.

It has been found that certain substances promote or enhance the emission of certain molecules although not themselves emitting under the prevailing conditions. If desired, the walls of the cavity may be made from, or lined with, such a substance, for example employing an indium-plated cavity for use with halogen reactant to produce an indium halide emission from a halogen sample. In other cases the substance may be a gas such as oxygen, introduced in small quantities through e.g., a capillary tube.

If the substance to be analysed is a liquid, it may be absorbed in, or adsorbed on, an inert nonemitting solid carrier, to prolong its retention in the cavity.

Liquid and gaseous samples may be introduced into the cavity during the course of the analysis, through a passage entering the cavity at a location remote from the opening thereof. Such samples may be diluted with inert and non-emitting carrier media.

In similar manner other gases may be introduced continuously to support the interaction which produces the emission. According to one such embodiment, a hollow space has an opening through which unburned hydrogen can approach the sheltered region. A capillary tube also communicating with the hollow space introduces an oxidizer along a separate path, the gases then mixing and being ignited to produce a localized combustion originating in or along the exposure path to the sheltered region.

The invention may be performed in various ways and some embodiments will now be described by way of example with reference to the accompanying drawings, in which.

Figure 1:
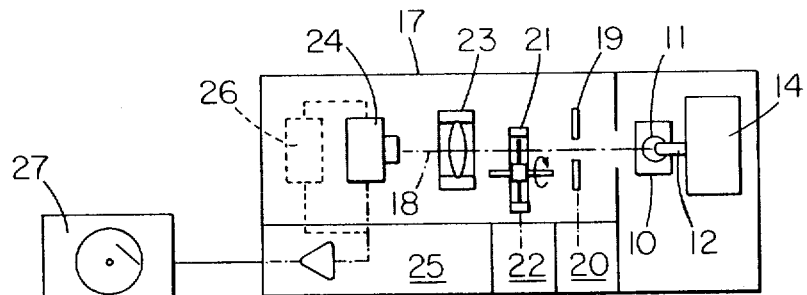
FIG. 1 is a schematic diagram of one embodiment of the apparatus.
Figure 2:
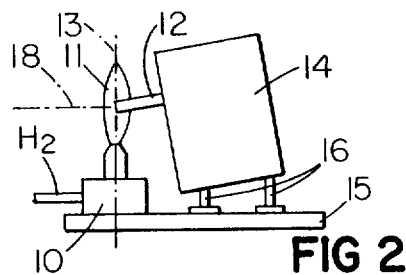
FIG. 2 is a side view of burner head, sample holder and sample holder support means.

The apparatus illustrated diagrammatically in FIGS. 1 and 2 comprises a burner head 10 for burning hydrogen (if desired diluted with an inert gas such as helium to lower the flame temperature or mixed with oxygen or air to raise the flame temperature) to produce a flame 11. Inserted into the flame from one side is sample holder 12. This is orientated nearly at right angles to the flame axis 13 but may be tilted slightly downwards towards the burner head 10. The sample holder is mounted in a support device 14. This in turn may be supported on a base 15 by means of adjustable legs 16 enabling the height and angle of tilt of the holder to be adjusted. On the opposite side of the flame from the sample holder 12 there is disposed a photometric analysis unit 17. This may be of generally conventional design and so need not be described in full detail. Its optical axis or line of sight 18 is aligned with the cavity (not visible in FIGS. 1 and 2) in the end of the sample holder 12. Briefly, the analysis unit 17 comprises an optical slit or collimator 19, slit adjustment or control means 20, a monochromator or filter 21, filter selection means 22, an optical lens system 23, a photometric detector 24 and an amplifier 25 which receives and amplifies the signals from the detector 24. If it is necessary or desired in any particular case to boost the detector output, the detector may be associated with a photomultiplier 26. The output from the amplifier 25 actuates a pen recorder 27, or other recording devices. The monochromator or filter 21 permits only light of a predetermined frequency to pass to the detector 27, and by using successive filters passing different frequencies a record of the intensity of radiation emitted by the sample under test over any desired range of frequencies can be obtained. The chart made by the recorder 27 will exhibit peaks of radiant energy at different frequencies, characteristic of the elements of the molecules of the sample.

Figures 3, 3B:
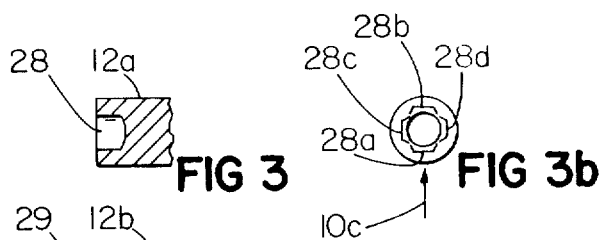
FIGS. 3 to 5 are sections of sample holders illustrating different cavity shapes suitable for solid samples.
FIG. 3b is an end view of the holder of FIG. 3.
Figure 4:
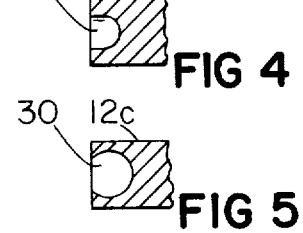
Figure 5:

FIG. 3 shows the tip of a sample holder 12a having in its tip a generally cyclindrical open cavity 28 with a slightly dished rear wall. In FIG. 4 the holder 12b has a generally cylindrical cavity 29 with a hemispherical rear wall. In FIG. 5 the holder 12c has an almost spherical cavity 30. Dimensions may vary; typical ones are as follows. In each of FIGS. 3 to 5 the holder diameter is 0.281 inch. In FIG. 3, the cavity diameter is 0.156 inch and its depth is 0.125 inch i.e. the ratio of depth to diameter is 0.8 : 1. In FIG. 4 the diameter and depth of the cavity are both 0.0156 inch i.e. the ratio of depth to diameter is 1 : 1. In FIG. 5 the diameter of the cavity is 0.218 inch and its spherical centre is 0.093 inch back from the tip surface i.e., the diameter of the opening is 0.114 inch and thus the ratio of the depth of the cavity 0.202 inch to the diameter of the opening is 1.8 : 1. Of course, numerous other cavity configurations are possible, provided the cavity has an opening through which the emission of the sample therein can be observed, and provided the aerodynamic characteristics are such that hydrogen from the flame can enter the cavity without an excessive tendency to eject the sample therein. More broadly the ratio of depth to diameter of the opening may be in the range 0.5:1 to 2:1 or 3:1.

Figure 3A:
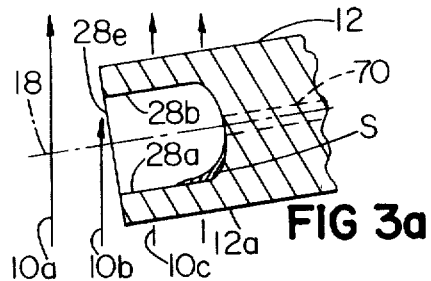
FIG. 3a is a magnified view of the holder of FIG. 3.

For a more intimate view of what occurs in the process of analysis reference is made of FIG. 3a. Here the holder 12 is shown positioned in the flame with the opening of the cavity 28 slightly pitched downwardly from a right angle or normal position relative to the axis 13 of the flame, the angle of tilt from normal ranging between about 5° and 20°, one preferred setting being 7°. The predominate direction of the flame, as indicated by flow lines, is across the opening, however, as schematically illustrated by flow line 10b, the pitch of the holder causes some of the flame gas to be intercepted.

In this case the sample is a liquid S resting upon the lower surface 28a of the cavity, spaced from open end 28e. The vaporized sample is exposed to the flame gas through the exposure path provided by the opening 28e, while the volatilized sample itself is sheltered from being swept away by the lower surface 28a, and by the upper surface 28b of the cavity, spaced above lower surface 28a. Referring to FIG. 3b in this embodiment side walls 28c and 28d joining the lower and upper surfaces 28a and 28b contribute also to the sheltering effect. A mixing and interaction of the sample vapor and the flame gas occurs, the molecular emission proceeding along optical path 18 to the detector.

The particular aerodynamic flows and mixing effects that occur at the exposure path and in the sheltered region depend upon the design and the orientation chosen. It is possible for a circular swirl of the gases to occur in the cavity, mixing and interaction (e.g. reduction of reactant vapor by hot hydrogen radicals) occurring over a deposit of solid or liquid sample and throughout the cross-section of the cavity while the rate of loss of the sample is kept low. By cooling a surface bounding the cavity, as by conduction from the end of the cavity to the mass of holder 12 which may be chilled prior to the analysis, surfaces bounding the sheltered region may enhance the radiation in accordance with the known (Salet) effect of a relatively cold plate according to flame emission technology. Other means of cooling as by insulation of one part of the holder from another or introduction of cooling fluid may be appropriately used.

On the other hand, depending upon the nature of the sample a higher level of heat is appropriate for the surface upon which solid or liquid sample rests, for promotion of decomposition and vaporization. Referring to FIG. 3a it is seen that the undersurface 12a of holder 12 is exposed directly to the flame and is spaced through only a short conduction path from lower surface 28a upon which the sample rests. Thus by appropriate selection of the material of the holder, heat may be conducted to the sample and as well removed from the end wall of the cavity.

In other instances the holder may be formed of an insulative material such as pressed asbestos in which a cavity is machined, or a layer of insulation applied about the holder. In such instances the heat of flame gas at the opening can provide the heat of vaporization in the case of a solid or liquid sample. In other instances supplementary heating such as an electrically resistive heating element, laser energy etc., may be employed to provide heat at appropriate positions in the sheltered region.

Referring still to FIG. 3a in an alternative embodiment a small capillary passage 70 is provided to communicate with the sheltered region. It is found that by introduction of air or oxygen in small quantities through such passages, enhanced emissions can be ontained, attributable in certain instances to increase in temperature of the interacting gases or to increase in rate of decomposition or vaporization. In some cases unburned hydrogen intercepted at the opening of the cavity may interact with the oxygen to produce an extremely localized flame for interacting with the sample.

Whatever the various specific effects employed, a general effect obtainable by use of the sheltered region is to localize and stabilize the region for emission and provide a precise region upon which the optical analysis device can be focused, thus contributing significantly to the consistency, uniformity and reproducibility of the analysis.

Figure 6:
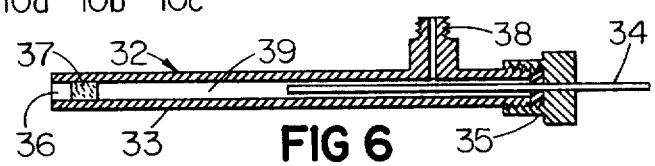
FIG. 6 is a section of a sample holder suitable for liquid or gaseous samples.

FIG. 6 shows a holder 32 suitable for a liquid or gaseous sample. It comprises a tube 33 into which the liquid or gas to be analysed can be introduced by means of a capillary tube 34 such as a hypodermic syringe needle. This enters the rear end of the tube 33 through a packing gland or seal. There is a nipple 38 at the side of the tube 33 through which can be introduced an inert diluent gas or liquid. The sample gas or liquid emerging from the capillary tube 34 mixes with the diluent gas or liquid (if provided) in the bore 39 of the tube 33 and the sample enters the cavity 36 wherein the characteristic emission occurs. The admission into the cavity may be continuous or discontinuous and at a rate controllable by adjusting the supply pressures, for example. In one example the tube 33 has an internal diameter of 2 millimeters and is approximately 5 centimeters long. A gaseous sample bled into the cavity at a rate of 2 to 5 millilitres per minute is operable without use of diluent. For a liquid sample, it may be injected through capillary 34 into the bore 39, just beyond the nipple 38. In this position it gradually is evaporated by the effects of heat conducted to the sample through the substance of tube 33 and of flow thereover of inert carrier gas of 2 to 5 millilitres per minute maintained through nipple 38. Under these circumstances control of the flow rate of the carrier gas is an effective control upon the rate of introduction of the sample to the sheltered region at the end of the tube.

Figure 7:
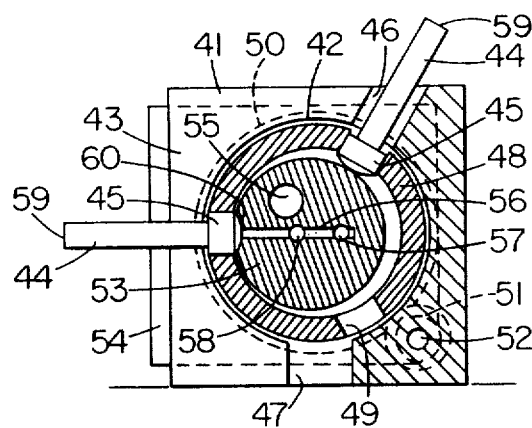
FIG. 7 is a diagrammatic sectional view of one form of sample holder support device.

The sample holder support device shown in FIG. 7 comprises a body 41 having a transverse bore 42 therein. In the forward part of the body (the left-hand part in FIG. 7) there is a gap or slot 43. This gap is slightly wider than the stem portion of sample holders 44 but narrower than a head portion 45 at the inner end of each sample holde so that although the stem portion can protrude through the gap, the head portion cannot enter the gap and so is retained in the bore 42. However, in the top wall of the body at 46, and in the bottom wall at 47, the gap is widened to permit the holder head 45 to pass through. Within the bore 42 so as to be rotatable therein there is a cylindrical sleeve 48 which has three apertures 49 each large enough to receive a holder head 45. At one end the sleeve carries a ring or gear teeth indicated by the dotted circle 50. Meshing with these gear teeth is a pinion 51 mounted on a transverse shaft 52. One end of the shaft protrudes from the side of the body 41 and carries a rotatable knob or handwheel (not shown). By turning the knob or handwheel clockwise, the operator can rotate the sleeve 48 counterclockwise in the body 41. Within the sleeve 48 there is a non-rotatble cylindrical member 53, the outside diameter of which is smaller than the inside diameter of the sleeve 48. The ends of the member 53 project beyond the body 41 and are supported in cheek pieces 54 which are mounted to be horizontally slidable relative to the body 41, to the left and right in FIG. 7. Springs (not shown) urge the cheek pieces and the cylindrical member 53 towards the left, as seen in the drawing. The cylindrical member 53 has a longitudinal bore 55 which accommodates an electrical heating element (not shown). It also has a small transverse bore 56 with which communicate two small longitudinal bores 57 and 58. Access to the three longitudinal bores 55, 57 and 58 is by means of conduits at one end of the member 53. These conduits must be sufficiently flexible to permit sliding movement of the member 53.

In use, a sample holder for introduction into the flame is inserted head downwards through the widened portion 46 of the gap so that its head 45 enters one of the apertures 49 in the rotatable sleeve 48 and rests on the surface of the cylindrical member 53. In the case of a solid sample, the holder selected will have a cavity such as any of those shown in FIGS. 3 to 5 in its tip or outer end. The sample can be introduced when the holder is in this position in the support device, or it may have been introduced previously. If it is desired to heat the sample holder, the heater in the bore 55 is switched on and the holder is heated by conduction. When the sample is to be presented to the flame, the sleeve 48 is rotated clockwise by one third of a revolution, to bring the holder into the position in which it is shown at the left of FIG. 7. If there was previously a holder in that position, it will be moved downwards by rotating sleeve 48 and will fall out or can be withdrawn through the widened portion 47 of the gap 43 when pointing vertically downwards.

To use the device for a liquid or gaseous sample, a different type of holder is used. Externally it is the same as the holders 44 illustrated, and it has a cavity at its tip 59, but it also has a longitudinal bore extending back from the inner wall of the recess and emerging through the centre of the domed end face 60 of the head 45. The cylindrical member has a complementary concave recess into which the domed end face 60 seats when the holder is in the horizontal position, the bore in the holder now being in register with the transverse bore 56 in the cylindrical member 53. Because the member 53 is spring-biassed towards the left as already described, and the head 45 of the holder it too large to enter the gap 43 in this position, sealing engagement between the end face 60 and the recess in the member 53 is assured. The gaseous or liquid sample is introduced into the cavity in the holder tip by means of the longitudinal bore 58 and the transverse bore 56 of the member 53, and the longitudinal bore in the holder. If it is desired to use a diluent or carrier also, this can be introduced through the other longitudinal bore 57.

This form of the device enables a sample holder to be prepared for use while another is in use, and for the change-over to be effected with a minimum of delay.

Representative examples of wavelengths at which measurements are taken are:

| | |
|---|---|
| Phosphorus | 500 nm |
| Selenium | 420–430 nm |
| Sulphur | 390 nm |
| Bromine | 374 nm |
| Chlorine | 360 nm |

The persistance of emission is usually in the order of 2 to 3 minutes, but may be prolonged by suitable adjustment of the operating conditions.

In an example of use of a cool hydrogen flame for molecular emissions, a flame is produced using a multi-aperture burner to which is fed a mixture of 3 to 4 litres per minute of nitrogen and 4 litres per minute of hydrogen. The air for combustion comes from the ambient, diffusing laterally through the gas stream as the stream progresses upwardly from the burner. Within the interior of the stream is a highly reducing atmosphere in which the holder is inserted for detection of sulphur from such compounds as Thiourea, $H_2SO_4$, $CuSO_4$, $FeSO_4$, $CoSO_4 \cdot 7H_2O$, $MnSO_4 \cdot 4H_2O$, $Na_2SO_4$, diphenylsulphide, thionanisole and tetrahydrothiophene. By mixture of certain quantities of oxygen or air with the hydrogen to be emitted from the burner (e.g., 1 to 4 litres per minute) the emission is enhanced despite the fact that at lower oxygen or air flow rates the emission is suppressed. The process may thus be used to detect sulphur in crude oil or in stack gases.

Similar analyses can detect halogens, e.g., trace amounts of chlorine in water, using the indium halide technique mentioned above or selenium as in biological materials, soils, effluents and pharmaceutical products.

With certain smaples, e.g., arsenic and antimony containing substances, the emission is enhanced by admission of small flows of oxygen or air along flow path 70 of FIG. 3a.

More generally, the technique above described can be applied essentially to all compounds that are sufficiently volatile and give an emission or which, though not volatile, can be reacted with another compound in the holder to produce such a volatile molecule. Elements that give well-known emissions in cool flames, such as boron and phosphorus, can be determined very sensitively, as can chloride, bromide and iodide, based on indium halide emission. Metals that give volatile halides (e.g., Co, Sn, Pb, Cu) can also be determined, as well as elements that cannot be determined by emission measurements using nebulization for sample introduction (Se, Te, Si, As, Sb, etc) metal chelates, such as lead pyrrolidinedithiocarbamate and the nickel, palladium and copper chelates of amino-substituted B-diketones on introduction to the cavity give emission bands characteristic of the metal and of the ligand, and very sensitive determination of the metal becomes possible. Organic halides and other organic compounds also give intense characteristic emissions, that have analytical implications.

In the various analyses not only the peak emission but the time integral under the curve of the emission are meaningful. In certain instances also a plot of the ratio of holder temperature to emission intensity is meaningful. The analysis device employed will vary depending upon whether the case is for a laboratory analysis (e.g. scanning grating monochrometer and photodetector) or process monitoring (e.g., filter photometer using a photo resist detector and a narrow band pass filter).

Conclusions

The invention provides a simple versatile and very effective technique for carrying out cool-flame emission analysis. It allows the analysis of microlitre volumes of solution or milligram weights of solids. The sheltered region or sheltering surfaces bounding it enhance molecular emission intenisty by 1. retaining the emitting species, thereby allowing the focused emission to be measured by a relatively slow responding detector-recorder system;

2. acting as a relatively cold body (Salet phenomenon);

3. acting as a third body in the ensuing molecular formation and/or excitation;

4. localizing and concentrating the analyte into the most sensitive region in the flame;

5. allowing introduction of the analyte without possible interfering effects of a solvent.

The technique offers increased selectivity by differentiating between compounds via their thermal stability in a reducing medium, the flame, and will enable the thermal properties of various compounds in the flame to be studied. This added selectivity alleviates the major interference in cool flames - that of involatile compound formation.

The technique offers similar advantages in certain instances of atomic emissions and similar analysis.

What we claim as our invention and desire to secure by Letters Patent is:

1. A method of analyzing a sample of a matter by emission spectroscopy in which a reactant sample is exposed to flame gas to produce emissions and the emissions are detected by an optical analysis device, characterized by the steps of providing an emission-promoting strucutre defining a sheltered region, exposing reactant vapor within said region to flame gas and focusing the optical analysis device upon the interacting gases in said region and further characterized by providing said sheltered region by a structure which surrounds and defines a hollow space with an open end, introducing the sample to the space, and maintaining said structure in relation to an external flame so that at least said open end lies in the interior of a flame with the predominant direction of movement of the flame gases in the vicinity of the said open end being generally across the said open end.

2. The method according to claim 1 including focusing said analysis device upon gases contained in said sheltered region through the end across which open flame gas flows.

3. The method according to claim 1 characterized in that the emission-promoting structure is disposed with the open end tilted slightly towards a burner from which the flame emanates to intercept a limited portion of the stream of flame gas for introduction into said sheltered region.

4. The method according to claim 1 characterized in providing, in contact with the sample in said region, a substance which promotes emission.

5. The method according to claim 4 characterized in that the substance is oxygen.

6. The method according to claim 4 characterized in that the substance is a solid material at a surface exposed to said sheltered region.

7. The method according to claim 1 characterized in controlling the temperature of a surface bounding said sheltered region for promoting the emission.

8. The method according to claim 7 characterized in that the temperature is controlled by appropriate selection of the material, size and shape of at least a portion of the emission promoting structure exposed to said sheltered region.

9. The method according to claim 1 characterized in providing a flame which produces hydrogen radicals that interact with reactant vapor contained in said sheltered region to produce molecular emissions.

10. An emission-promoting structure for use in an analyzer in conjunction with a flame and an optical emission analysis device, said structure defining a sheltered region for containing reactant, an exposure path for flame gas to interact with the reactant in the sheltered region and an optical path projecting out of said sheltered region whereby, under conditions influenced by said structure, reactant vapor in said sheltered region and flame gas can mix, interact and emit along said optical path to said analysis device radiation characteristic of said interaction.

11. The structure according to claim 10 characterized in that said sheltered region is sized between about 1 cubic millimeter and 1 cubic centimeter.

12. The structure according to claim 10 for use with a burner producing a flame outside of said sheltered region characterized in that said structure defining said sheltered region is smaller than the flame and movable to a predetermined position in a portion of the flame to expose reactant to flame gas.

13. The structure according to claim 10 characterized in that means are provided for introducing hydrogen to said sheltered region through said exposure path and means are provided for introducing a limited flow of oxidizer through a separate stream into said sheltered region.

14. The structure according to claim 10 characterized by including a heat control surface immediately adjacent said sheltered region.

15. The structure according to claim 14 characterized in that said heat control surface is connected through a heat conductive path to a conductive mass defining a heat sink.

16. The structure according to claim 14 characterized in that said heat control surface is connected through a heat transfer path of predetermined heat transfer properties to a heat receiving surface exposed to a flame outside of said sheltered region.

17. The structure according to claim 14 characterized in that means are provided for maintaining said heat control surface cooler than the flame, said control surface being positioned for exposure to a mixture of said reactant vapor and flame gas whereby emissions from their interaction can be enhanced.

18. The structure according to claim 14 characterized in that means are provided for causing a heat transfer fluid to flow in contact with a conductive path leading to said heat control surface.

19. The structure according to claim 14 characterized in that means are provided for maintaining said heat control surface at an elevated temperature for producing heated reactant vapor.

20. The structure according to claim 14 characterized in that said heat control surface comprises a support for a liquid or solid reactant and means are provided for maintaining said heat control surface at an elevated temperature relative to said reactant thereby to conduct heat into said reactant to promote its decomposition and vaporization.

21. The structure according to claim 10 characterized in having a lower sheltering surface and an upper sheltering surface spaced a predetermined distance above said lower sheltering surface, the space therebetween comprising said sheltered region.

22. The structure according to claim 21 characterized in that said sheltering surfaces are connected by side wall sheltering surfaces whereby all said sheltering surfaces together surround and define a hollow space.

23. The structure according to claim 22 characterized in that said surfaces form a cavity in a structurally rigid member.

24. The structure according to claim 21 characterized in having a side opening which defines said exposure path.

25. The structure according to claim 24 in combination with means producing a flame outside of said sheltered region, characterized in that a device positions said structure in relation to the flame so that at least said opening lies in the interior of the flame with the predominant direction of movement of the flame gases in the vicinity of said opening being generally across the said opening.

26. The structure according to claim 25 characterized in that said opening is tilted slightly toward a burner from which the flame emanates to intercept a limited portion of the stream of said flame gas.

27. The structure according to claim 26 characterized in that the axis of said opening is tilted between 5° and 20° from the direction perpendicular to the axis of the predominate flow of flame gases.

28. The structure according to claim 24 characterized in that said opening is of the range of 1 mm to 1 cm in diameter.

29. The structure according to claim 21 characterized in having an opening in the range of 1 mm to 1 cm diameter and a bottom wall at a depth from said opening on the order of the diameter of said opening.

30. The structure according to claim 10 characterized by including a passage for introducing a fluid reactant into said sheltered region.

31. The strucutre according to claim 10 characterized by including a carrier surface bounding said sheltered region for absorbing or adsorbing a fluid reactant.

32. The structure according to claim 10 characterized by combination with a burner constructed to produce a cool hydrogen diffusion flame for producing molecular emissions.

33. The structure according to claim 10 characterized in that a burner is provided to produce a flame having a diameter between about 5 to 20 mm and a flame height between about 30 and 200 mm.

34. The structure according to claim 33 characterized in that said burner is connected to a source of hydrogen and a source of inert cooling gas.

35. The structure according to claim 34 including means for mixing with said hydrogen, oxygen or oxygen-containing gas.

36. The structure according to claim 10 characterized by combination with a guide device for repeatedly guiding said structure from a retracted filling position to a constant position relative to a flame and an analysis device.

37. The structure according to claim 10 characterized by combination with a burner for producing said flame and an optical emission analysis device, said analysis device defining an optical path aligned to receive the emitted radiation directly from said sheltered region for analysis.

38. The structure according to claim 29 characterized in that the ratio of said depth from said opening to said diameter of said opening is in the range of 0.5:1 to 3:1.

39. The structure according to claim 29 characterized in that said bottom wall is concave.

40. The structure according to claim 24 characterized in that said sheltered region is generally defined by a sphere having its center positioned such that the ratio of the diameter of said opening to the diameter of said sphere is about 0.5:1.

41. The structure according to claim 24 characterized in that the ratio of the maximum transverse dimension of said opening to the maximum transverse dimension of said sheltered region is less than 1:1 and greater than 0.1:1.

* * * * *